(12) United States Patent
Guzik et al.

(10) Patent No.: US 10,194,390 B2
(45) Date of Patent: Jan. 29, 2019

(54) ENERGY EFFICIENT COMMUNICATION FOR DATA ASSET TRANSFERS

(71) Applicants: WHP WORKFLOW SOLUTIONS, INC., North Charleston, SC (US); GETAC TECHNOLOGY CORPORATION, Taipei (TW)

(72) Inventors: Thomas Guzik, Edina, MN (US); Muhammad Adeel, Edina, MN (US)

(73) Assignees: WHP Workflow Solutions, Inc., North Charleston, SC (US); Getac Technology Corporation, Taipei (TW)

(*) Notice: Subject to any disclaimer, the term of this patent is extended or adjusted under 35 U.S.C. 154(b) by 41 days.

(21) Appl. No.: 15/376,644

(22) Filed: Dec. 12, 2016

(65) Prior Publication Data
US 2018/0167877 A1    Jun. 14, 2018

(51) Int. Cl.
| H04W 4/00 | (2018.01) |
| H04W 52/02 | (2009.01) |
| H04W 4/06 | (2009.01) |
| H04W 4/80 | (2018.01) |

(52) U.S. Cl.
CPC ......... *H04W 52/0209* (2013.01); *H04W 4/06* (2013.01); *H04W 4/80* (2018.02)

(58) Field of Classification Search
None
See application file for complete search history.

(56) References Cited

U.S. PATENT DOCUMENTS

| 9,118,355 B2 | 8/2015 | Choi et al. |
| 2011/0018998 A1 | 1/2011 | Guzik |
| 2011/0191058 A1* | 8/2011 | Nielsen ................ B65D 83/203 702/130 |
| 2012/0079609 A1 | 3/2012 | Bender et al. |
| 2012/0108295 A1 | 5/2012 | Schell et al. |
| 2013/0036231 A1 | 2/2013 | Suumäki |

(Continued)

OTHER PUBLICATIONS

International Search Report and Written Opinion for International Application No. PCT/US2017/065896, dated May 31, 2018, 18 pages.

*Primary Examiner* — Anh Vu H Ly
(74) *Attorney, Agent, or Firm* — Han Santos, PLLC; Elliott Y. Chen

(57) ABSTRACT

A portable recording device may use a low-energy transceiver to communicate with a computing device in order to activate a high-energy communication connection with the computing device for exchanging data. The portable recording device may initially broadcast a device identifier of the portable recording device via the low-energy transceiver. The portable recording device may then connect to a computing device via a high-energy communication connection that is formed using a high-energy transceiver of the portable recording device. The computing device may be triggered to initiate a formation of the high-energy communication connection with the portable recording device by the device identifier broadcasted using the low-energy transceiver. Subsequently, the portable recording device may send data files to the computing device via the high-energy communication connection. The data files may include a data asset that is captured by the portable recording device or metadata for the data asset.

23 Claims, 9 Drawing Sheets

(56) References Cited

U.S. PATENT DOCUMENTS

| | | | |
|---|---|---|---|
| 2014/0091987 A1 | 4/2014 | Lee et al. | |
| 2014/0160248 A1* | 6/2014 | Pomerantz | G06F 1/163 |
| | | | 348/47 |
| 2014/0215558 A1 | 7/2014 | Hoyos et al. | |
| 2016/0192164 A1* | 6/2016 | Scully | H04W 4/90 |
| | | | 455/404.2 |
| 2016/0325680 A1* | 11/2016 | Curtis | B60R 1/00 |
| | | | 370/338 |
| 2018/0063874 A1* | 3/2018 | Wu | H04W 76/10 |
| | | | 370/338 |
| 2018/0131898 A1* | 5/2018 | Guzik | H04N 5/91 |
| | | | 370/338 |

* cited by examiner

ENERGY EFFICIENT COMMUNICATION FOR DATA ASSET TRANSFERS

BACKGROUND

Law enforcement agencies are increasingly equipping their law enforcement officers with portable recording devices. Such law enforcement agencies may have policies mandating that their law enforcement officers use these portable recording devices to record their interactions with the public. The recordings may serve to protect the public from improper policing, as well as protect law enforcement officers from false allegation of police misconduct.

In some implementations, a portable recording device that is worn by a law enforcement officer may be wirelessly connected to a mobile computing device that is in a law enforcement vehicle. In turn, the mobile computing device in the law enforcement vehicle may be connected to a network operations center (NOC) of a police department via a cellular network. In this way, the mobile computing device may serve as a communication relay point between the portable recording device and the NOC. The communication link may be used by the NOC to send device commands directly to the portable recording device. In response, the portable recording device may send data assets or live multimedia streams that are captured by the portable recording device to the NOC.

However, the maintenance of the wireless communication connection between the portable recording device and the mobile computing device may cause a significant power drain for the portable recording device. For example, maintaining such a constant Wi-Fi communication connection may demand a relatively high amount of energy output from a battery of the portable recording device. Further, the battery capacity of the portable recording device may be constrained by the small form factor of the device. In many instances, these factors may conspire to limit the effective operating time of the portable recording device.

SUMMARY

Described herein are techniques for using dual communication connections to establish energy efficient communication between a portable recording device and a computing device. The portable recording device may be worn by a law enforcement officer, and the computing device may reside in a law enforcement vehicle. Furthermore, the computing device may be wirelessly connected to a network operations center (NOC) via a cellular communication connection. Accordingly, by using the computing device as a communication relay point, the NOC may send device commands directly to the portable recording device. In response, the portable recording device may send data assets or live multimedia streams that are captured by the portable recording device to the NOC. The data assets may be in the form of video recordings, audio recordings, or multimedia recordings. However, in alternative instances, the computing device may reside at the NOC.

The dual communication connections may include a high-energy communication connection and a low-energy communication connection. In at least one embodiment, the high-energy communication connection may be a Wi-Fi connection, while the low-energy communication connection may be a Bluetooth connection or a near field communication (NFC) connection. In various embodiments, the low-energy communication connection may be used to trigger the establishment of the high-energy communication connection for the purpose of transferring data between the portable recording device and the computing device. Following the transfer of the data, the high-energy communication connection may be terminated to conserve energy while the portable recording device continues to broadcast a heartbeat signal to the computing device using a low-energy communication channel. The low-energy heart beat signal may be used by the computing device to re-establish the high-energy communication connection in order to receive data from the portable recording device.

In at least one embodiment, a portable recording device may initially broadcast a device identifier of the portable recording device via the low-energy transceiver. A computing device may be triggered to initiate a formation of a high-energy communication connection with the portable recording device by the device identifier broadcasted using the low-energy transceiver. The portable recording device may then connect to the computing device via a high-energy communication connection that is formed using a high-energy transceiver of the portable recording device. Subsequently, the portable recording device may send data files to the computing device via the high-energy communication connection. The data files may include a data asset that is captured by the portable recording device or metadata for the data asset.

In other embodiments, a portable recording device may initially broadcast a device identifier of the portable recording device via the low-energy transceiver. In response to receiving an acknowledgement of the device identifier from a mobile dock, the portable recording device may send authentication data via the low-energy transceiver to the mobile dock. The authentication data may be sent in response to the portable recording device determining that the mobile dock is authorized to communicate with the portable recording device. Subsequently, the portable recording device may form a high-energy communication connection with the mobile dock such that the portable recording device may receive commands via the high-energy communication connection. The commands may cause the portable recording device to perform actions with respect to data files stored on the portable recording device. The data files may contain data assets, such as video recordings, audio recordings, and multimedia recordings.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
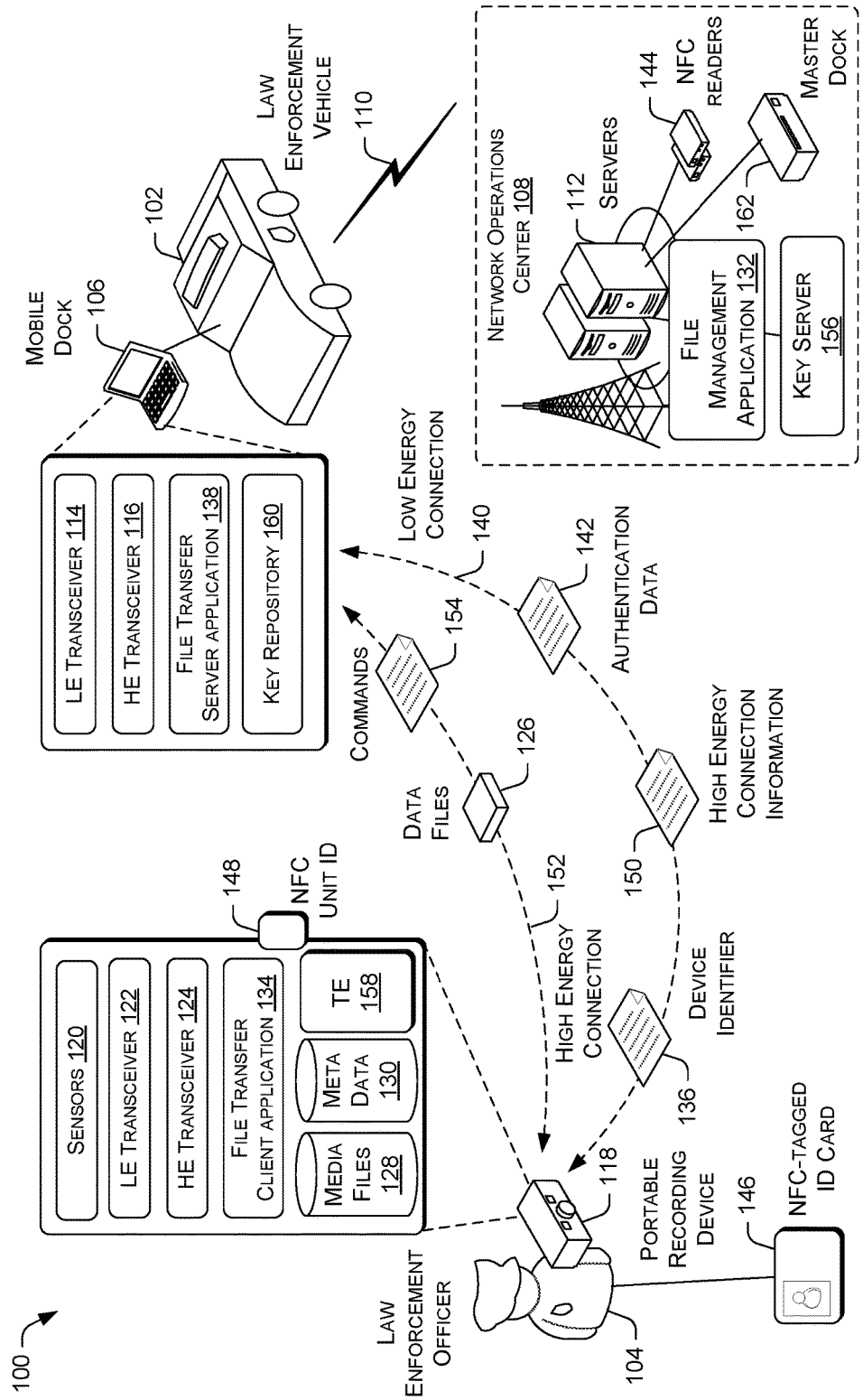
FIG. 1 illustrates an example architecture for implementing energy efficient communication for data asset transfers.

This disclosure is directed to techniques for using dual communication connections to establish energy efficient communication between a portable recording device and a computing device. The portable recording device may be worn by a law enforcement officer, and the computing device may reside in a law enforcement vehicle. Furthermore, the computing device may be wirelessly connected to a network operations center (NOC) via a cellular communication connection. Accordingly, by using the computing device as a communication relay point, the NOC may send device commands directly to the portable recording device. In response, the portable recording device may send data assets or live multimedia streams that are captured by the portable recording device to the NOC. The data assets may be in the form of video recordings, audio recordings, or multimedia recordings. However, in alternative instances, the computing device may reside at the NOC.

In various embodiments, each of the portable recording device and the computing device may have a low-energy communication transceiver and a high-energy communication transceiver. High-energy and low-energy communications refers to the relative power draw of those communication transceivers. Generally, the operation of a mobile device, such as the portable recording device, is constrained by battery lifetime. Accordingly, the less power that a device uses for communication, the longer the battery lifetime. However, the power draw used by a communications protocol (or any other aspect of a communications protocol) cannot be unilaterally changed, as otherwise other devices that are compliant with the communications protocol cannot be guaranteed to operate properly. Therefore, various embodiments are disclosed where a communications protocol that uses less power to transmit and/or poll, i.e., a low-energy communications protocol is used preferentially, and a communications protocol that uses more power to transmit and/or poll is turned on only when triggered by a command over the low-energy communications protocol. Analogously, a low-energy transceiver uses less power (i.e., energy draw per period of time) than a high-energy transceiver. High-energy communications protocols typically have more communications bandwidth, thus enabling faster data exchange thereby justifying the power draw.

In at least one embodiment, a low-energy communication transceiver may be a Bluetooth transceiver or a near field communication (NFC) transceiver. On the other hand, a high-energy communication transceiver may be a Wi-Fi transceiver. In one implementation. The portable recording device may use its low-energy communication transceiver to repeatedly broadcast a heartbeat signal that includes a device identifier of the portable recording device. In various embodiments, the device identifier may be an electronic serial number (ESN), a globally unique identifier (GUID), an integrated circuit card identifier (ICCID), or any other unique digital identifier stored in the portable recording device. In turn, the computing device may use the device identifier contained in the heart beat signal to verify that no current high-energy communication connection exists between the portable recording device and the computing device. Upon verification of the lack of existing high-energy communication connection, the computing device may determine whether the high-energy communication connection is to be established.

In response to determining that high-energy communication connection is to be established, the computing device may provide additional identification information to the computing device. In turn, the computing device may provide communication setting information to the portable recording device. Accordingly, portable recording device my use the communication setting information to establish a high-energy communication connection between the portable recording device and the computing device.

Subsequently, the computing device may send commands to the portable recording device via the high-energy communication channel. The commands may cause the portable recording device to upload data, such as data assets, metadata for the data assets, previews of the data assets, and/or so forth, to the computing device. In some instances, the commands may further cause the portable recording device to terminate the high-energy communication connection following the upload of the data. The termination of the high-energy communication connection may enable the portable recording device to conserve energy. The conservation of energy may prolong the battery life and operational endurance of the portable recording device. In some embodiments, the portable recording device and the computing device may use public-private key asymmetric encryption to secure the establishment and use of the high-energy communication connection. Example implementations are provided below with reference to FIGS. 1-9.

Example Architecture

FIG. 1 illustrates an example architecture for implementing energy efficient communication for data asset transfers. The architecture 100 may include a law enforcement vehicle 102 that is operated by a law enforcement officer 104. The law enforcement vehicle 102 may be equipped with a mobile computing device 106 that communicates with a NOC 108 via a network connection 110. The mobile computing device 106 may be referred to as a mobile dock. The NOC 108 may be a command center that is part of a law enforcement agency, or a facility that is operated by a third-party that is offering services to the law enforcement agency. The NOC 108 may include servers 112 that implement a computer-assisted dispatch system and a data file storage system. The network connection 110 may include a local area network ("LAN"), a larger network such as a wide area network ("WAN"), a carrier network, or a collection of networks, such as the Internet. Protocols for network communication, such as TCP/IP, may be used to implement the network connection 110. In some instances, the network connection 110 may be a cellular network connection. The carrier network may provide telecommunication and data communication in accordance with one or more technical standards.

The mobile dock 106 may be a tablet computer, a laptop computer, a handheld computer, or another computing device. The mobile dock 106 may include output devices (e.g., a display screen) on which dispatch data and associated law enforcement information may be displayed. The mobile dock 106 may also include input device (e.g., a keyboard) by which the law enforcement officer 104 may enter requests for law enforcement information, responses to dispatch requests, resolution reports for incidents or events, and/or so forth. The mobile dock 106 may be equipped with a low-energy transceiver 114 and a high-energy transceiver 116. For example, the low-energy transceiver 114 may be a Bluetooth or a NFC transceiver, while the high-energy transceiver 116 may be a Wi-Fi transceiver. In some instances, the mobile dock 106 may be further equipped with a power port (e.g., a Universal Serial Bus (USB) port, a Lightning port, etc.) that provides power and communication interfaces.

The portable recording device 118 may be worn by the law enforcement officer 104 as the officer performs official duties. The portable recording device 118 may be a portable video recording device, a portable audio recording device, or a portable multimedia recording device that records both video and audio data via sensors 120. The sensors 120 may include microphones, video image sensors, and/or so forth. The portable recording device 118 may include on-board memory that stores the recordings, the audio recordings, or the multimedia recordings as data assets. The portable recording device 118 may be manually activated to record the data assets by the law enforcement officer 104. For example, the portable recording device 118 may include an input interface (e.g., physical buttons, a gesture recognition mechanism, a voice activation mechanism) that enables the law enforcement officer 104 to start, stop, and/or pause the recording of the data assets. The data assets may capture incidents, events, crimes, and/or so forth, that are of law enforcement or public interest as the law enforcement officer 104 performs official duties.

Additionally, the portable recording device 118 may have communication capabilities. The portable recording device 118 may be equipped with a low-energy transceiver 122 and a high-energy transceiver 124. For example, the low-energy transceiver 122 may be a Bluetooth or a NFC transceiver, while the high-energy transceiver 124 may be a Wi-Fi transceiver. Accordingly, the portable recording device 118 may use the low-energy transceiver 122 to form a low-energy communication connection with the mobile dock 106, and use the high-energy transceiver 124 to form a high-energy communication connection with the mobile dock 106. The high-energy communication connection may provider greater data bandwidth and/or data throughput than the low-energy communication connection. Accordingly, the high-energy communication connection may be used by the portable recording device 118 to transmit data files 126 to the mobile dock 106 on a periodic or on-demand basis. The data files 126 may include media files 128, metadata 130 regarding the data assets, officer commentaries and notes regarding the data assets, and/or so forth. The metadata for a data asset may include associated case identification information, incident identification information, event identification information, a time and date stamp, a name of the associated law enforcement officer, a badge number of the associated law enforcement officer, a location at which at the data asset is captured, a unit identifier of the portable recording device that captured the data asset, officer commentary on data assets, as well other pertinent information. The pertinent information may include a GPS location of the portable recording device, the total number of data assets captured by the device, the number of data assets that are captured each sensor of the device, sensor and operational data regarding the device, and/or so forth.

In turn, the mobile dock 106 in the law enforcement vehicle 102 may transmit the data files 126 to the NOC 108. The NOC 108 may include a file management application 132 that classifies and stores the data files 126 for subsequent retrieval, processing, and/or viewing. The use of the low-energy communication to trigger the formation of an on-demand high-energy communication connection between the mobile dock 106 and the portable recording device 118 may reduce the energy consumption and prolong the operational battery life of the portable recording device 118.

In operation, a file transfer client application 134 on the portable recording device 118 may command the low-energy transceiver 122 to broadcast a device identifier of the device on a periodic basis. For example, the low-energy transceiver 122 may broadcast a device identifier 136 once every second. The device identifier 136 may be a device serial number, a device alphanumeric code, or another identifier that uniquely identifies the portable recording device 118. The low-energy signal that encodes the device identifier may be picked up by the low-energy transceiver 114 of the mobile dock 106. Accordingly, a file transfer server application 138 may check the device identifier of the portable recording device 118 against a connection table stored in the mobile dock 106 to determine whether the mobile dock 106 already has a high-energy communication connection with the portable recording device 118. If no such high-energy communication connection exists, the file transfer server application 138 may determine whether a high-energy communication connection is desired. The high-energy communication connection may be desired if there is a scheduled or pending task to acquire one or more data files 126 from the portable recording device 118. The task may be directly initiated by the file transfer server application 138 or by the file management application 132 of the NOC 108.

Thus, if the file transfer server application 138 on the mobile dock 106 determines a high-energy communication connection to the portable recording device 118 is desired, the file transfer server application 138 may use its low-energy transceiver 114 to send a device identifier acknowledgement message to the portable recording device 118 via a low-energy communication connection 140. Upon receiving the device identifier acknowledgement, the file transfer client application 134 on the portable recording device 118 may send authentication data 142 that includes an officer identifier and a unit identifier that are associated with the device to the mobile dock 106. The officer identifier may identify an officer (e.g., law enforcement officer 104) that is using the portable recording device 118. The unit identifier may be a unique identifier of the portable recording device 118 that is assigned by a law enforcement agency, in which the unit identifier may differ from the device identifier. The officer identifier may be inputted into the portable recording device 118 by the law enforcement officer 104 as a part of the device initialization.

In some embodiments, the device identifier acknowledgement message sent by the file transfer server application 138 may include a dock identifier of the mobile dock 106. Accordingly, upon receiving the device identifier acknowledgement message, the file transfer client application 134 may extract the dock identifier from the device identifier acknowledgement message and verify the dock identifier against a list of authorized dock identifiers that are stored on the portable recording device 118. In at least one embodiment, the portable recording device 118 may have obtained the list of authorized dock identifiers from the NOC 108. Thus, if the file transfer client application 134 is able to match the dock identifier to an authorized dock identifier on the list, the file transfer client application 134 may send the authentication data 142 to the mobile dock 106.

In alternative embodiments, the device identifier acknowledgement message sent by the file transfer server application 138 may include a device authorization identifier (e.g., a device type identifier) that identifies the mobile dock 106 as the type of device that is authorized to communicate with the portable recording device 118. Accordingly, the file transfer client application 134 may compare the device authorization identifier to a list of device authorization identifiers that are stored on the portable recording device 118. Accordingly, if the device authorization identifier is on the list, the file transfer client application 134 may send the authentication data 142 to the mobile dock 106. In at least one embodiment, the portable recording device 118 may have the list of device authorization identifiers pre-stored in the portable recording device 118. Alternatively, the portable recording device 118 may obtain the list of device authorization identifiers from the NOC 108.

The mobile dock 106 may receive the authentication data 142 via the low-energy communication connection 140. Subsequently, the file transfer server application 138 on the mobile dock 106 may use an assignment table to verify that the officer identifier and the unit identifier that the portable recording device 118 is in fact checked out by the law enforcement officer 104. The law enforcement officer 104 may have originally checked out the portable recording device 118 for use by checking out the device at the NOC 108. In various embodiments, the servers 112 at the NOC may be connected one or more NFC readers 144. Further, each of the law enforcement officers may be issued unique NFC-tagged identification cards, and each portable recording device 118 may be equipped with a unique NFC unit identifier. For example, the law enforcement officer 104 may be issued an NFC-tagged identification card 146, and the portable recording device 118 may be equipped with the NFC unit identifier 148. The NFC-tagged identification card 146 may include an officer identifier that uniquely identifies the law enforcement officer 104.

Accordingly, during the checkout process, the NFC unit identifier 148 of the portable recording device 118 may be scanned with a NFC reader. Subsequently, the NFC-tagged identification card 146 the law enforcement officer 104 may be scanned with the NFC reader in a predetermined amount of time to associate the officer with the portable recording device. For example, following a scan of a NFC unit identifier, the file management application 132 may prompt a user to scan a NFC-tagged identification card. The association information may be stored in an assignment table at the NOC 108. Furthermore, the file management application 132 of the NOC 108 may update the mobile dock 106 with the latest version of the assignment table on a periodic basis. However, in alternative embodiments, the order in which the NFC unit identifier 148 and the NFC-tagged identification card 146 are scanned may be reversed to achieve the same association.

Following verification of the officer identifier of law enforcement officer 104 and the unit identifier of the portable recording device 118, the file transfer server application 138 may send high-energy connection information 150 to the portable recording device 118 via the low-energy communication connection 140. For example, in scenarios where the high-energy connection is a Wi-Fi connection, the information may include an access point identifier (e.g., Service Set Identifier (SSID)), the security encryption scheme type, and an access point password. Upon receiving the high-energy connection information 150, the file transfer client application 134 may use the information to establish a high-energy communication connection 152 with the mobile dock 106. The connection may be established via the high-energy transceiver 124 of the portable recording device 118 and the high-energy transceiver 116 of the mobile dock 106. For example, in the case of a Wi-Fi connection, the mobile dock 106 may act as a Wi-Fi access point, and the portable recording device 118 may act as a Wi-Fi client.

In some instances, the file transfer client application 134 may temporarily halt the broadcast of the device identifier 136 by the portable recording device 118 prior to the initiation of the high-energy communication connection. The temporary cessation of the broadcast may reduce the workload of the file transfer serve application on the mobile dock 106. This is because there may be multiple portable recording devices that are broadcasting their device identifier in the vicinity of the mobile dock 106, and the verification of every device identifier takes a certain amount of computing resources. However, the broadcast of the device identifier 136 may be halted for a predetermined finite duration (e.g., one minute), then the broadcast may resume. The resumption of the device identifier broadcast by the portable recording device 118 may provide another opportunity for the establishment of another high-energy communication connection in the event the establishment of the high-energy communication connection 152 fails.

The high-energy communication connection 152 may be used by the file transfer server application 138 of the mobile dock 106 to send commands 154 to the portable recording device 118. The commands 154 may include specific commands that direct the file transfer client application 134 to provide one or more data files 126 to the mobile dock 106. In some instances, the file transfer client application 134 may provide live streaming of the audio and/or video that is captured by the portable recording device 118 to the mobile dock 106. In other instance, the file transfer client may provide a preview of data asset to the mobile dock 106. For example, the preview may be a motion JPEG image that previews a data asset for a predetermined amount of time.

The commands 154 may further include a command that directs the file transfer client application 134 to terminate the high-energy communication connection 152 following the upload of the one or more data files 126 in order to prolong the operational battery life of the portable recording device 118. However, in other embodiments, the file transfer client application 134 may terminate the high-energy communication connection 152 when no command is received for a predetermined amount of time. In other words, the file transfer client application 134 may automatically time out the high-energy communication connection 152 in such an instance. Other commands may include commands that call for the uploading data files to the portable recording device 118 from the NOC 108, the presentation of data files to the law enforcement officer 104 for review, and/or so forth.

In some embodiments, the exchange of data between the portable recording device 118 and the mobile dock 106 may be protected via asymmetric encryption. In such embodiments, a key server 156 at the NOC 108 may provide the mobile dock 106 with a private key, and the portable recording device 118 with a public key of the public-private encryption key pair. In at least one implementation, the public key may be transferred to the portable recording device 118 at the NOC via a wired interface. In turn, the portable recording device 118 may store the public key in a trusted environment 158 on the device. The trusted environment 158 may be an isolated execution space that is provided by dedicated software and/or hardware of a device. A trusted environment 158 sometimes is an execution space guaranteed to start up first during a boot process for the device 118. In this way, the likelihood of a compromised root level binary/device driver from loading into the trusted environment 158 is minimized.

In one embodiment, the trusted environment 158 may employ a dedicated memory space or memory chip that is not accessible by applications and/or hardware components not located in the dedicated memory space or memory chip, unless such applications and/or hardware components are provided with special access privileges through secure communication channels. The isolation of the trusted environment 158 may provide a high level of security for the execution code or data stored in the execution space. Likewise, the key server 156 may provide the private key to the mobile dock 106 in a similar manner, and the mobile dock 106 may store the private key in a corresponding trusted environment.

During a secure communication negotiation, the file transfer client application 134 on the portable recording device 118 may encrypt a generated token with the pubic key to generate an encrypted secret. The encrypted secret may be transmitted to the mobile dock 106 via the low-energy communication connection 140. The file transfer server application 138 on the mobile dock 106 may decrypt the encrypted secret to generate a decrypted token. The decrypted token is then sent by the file transfer server application 138 back to the file transfer client application 134 via the low-energy communication connection 140. The file transfer client application 134 may compare the decrypted token with the generated token. If the two tokens match, the file transfer client application 134 may initiate encrypted communication with the file transfer server application 138 using the public-private encryption key pair. During the encryption communication, data that are sent from the portable recording device 118 to the mobile dock 106 are encrypted via the public key. Accordingly, the authentication data 142 and the data files 126 may be protected during transmission. In some embodiments, instead of directly pre-placing a public key to the portable recording device 118 and the private key to the mobile dock 106, the key server 156 may send a public-private encryption key pair to a key repository 160 on the mobile dock 106. In turn, the key repository 160 may be responsible for providing the private key for use by the file transfer server application 138, as well as providing the public key to the portable recording device 118. For example, the key repository 160 may distribute the public key to the trusted environment 158 when the portable recording device 118 is connected to the mobile dock 106 via a wired interface, such as a USB interface. However, in other embodiments, the key server 156 may reside directly on the mobile dock 106, which means that the mobile dock 106 is responsible for distributing the public key to the file transfer client application 134 portable recording device 118.

In some embodiments, the NOC 108 may be equipped with a master dock 162. The master dock 162 may function in a similar manner as the mobile dock 106 in terms using a low-energy communication connection to activate a high-energy communication connection. The high-energy communication connection may be used by the master dock 162 for the purpose of exchanging data with portable recording devices.

Example Portable Recording Device Components

Figure 2:
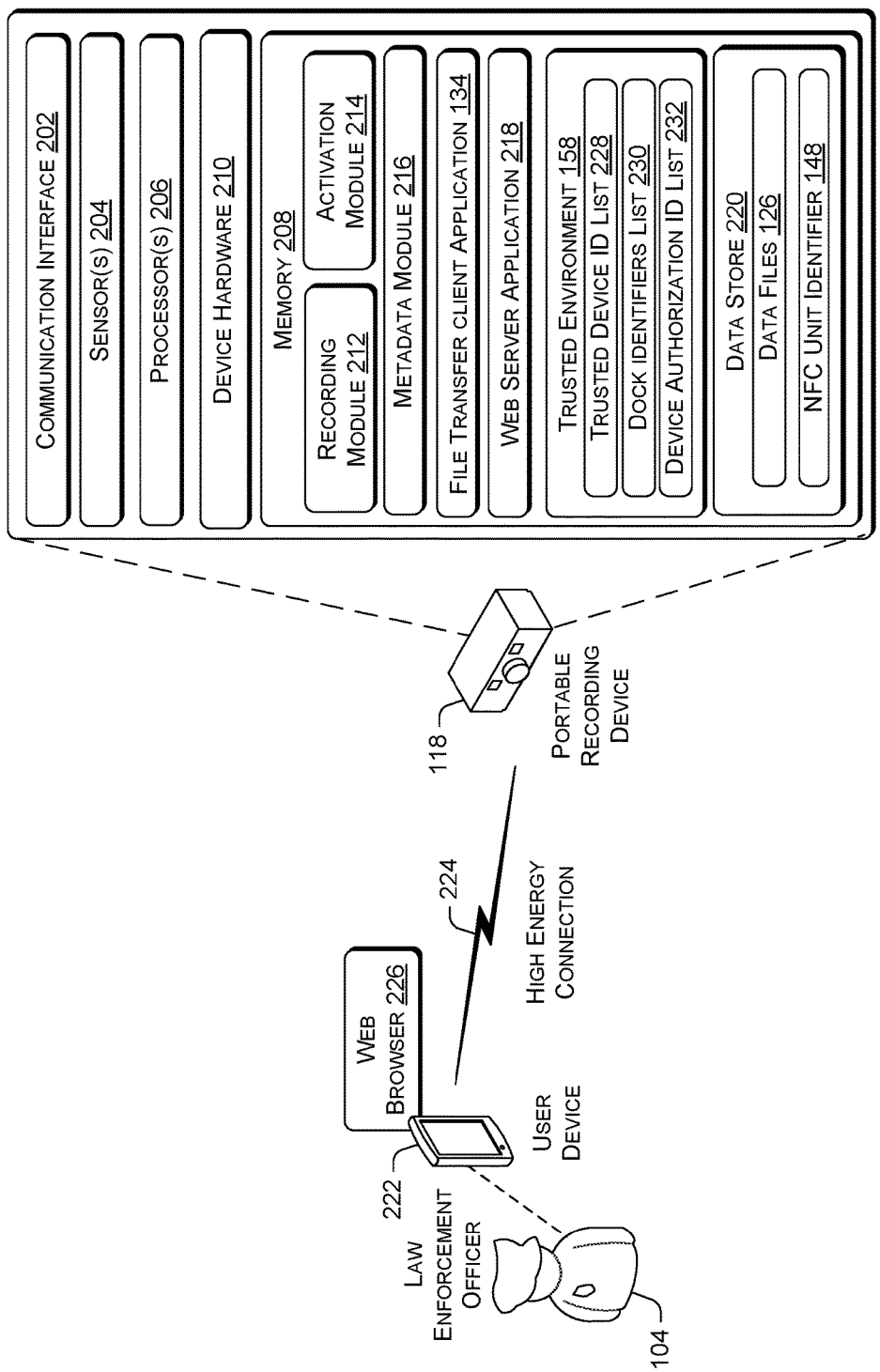
FIG. 2 is a block diagram showing various components of a portable recording device that uses energy efficient communication to transfer data to a computing device.

FIG. 2 is a block diagram showing various components of a portable recording device that uses energy efficient communication to transfer data to a computing device. The portable recording device 118 may be equipped with a communication interface 202, one or more sensors 204, one or more processors 206, and memory 208. The communication interface 202 may include wireless and/or wired communication components that enable the device to transmit or receive voice or data communication via the network connection 110, as well as other telecommunication and/or data communication networks. In various embodiments, the communication interface 202 may include the low-energy transceiver 122 and the high-energy transceiver 124, and/or so forth. The sensors 204 may include a compass, an accelerometer, and/or a global positioning system (GPS) sensor. The compass, the accelerometer, and the GPS sensor may detect orientation, movement, and geolocation of the portable recording device 118.

The memory 208 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The device hardware 210 may include additional sensors in the form of a camera and/or a microphone, and user interface hardware, such as physical buttons, a gesture recognition mechanism, or a voice activation mechanism. The device hardware 210 may further include signal converters, antennas, modems, hardware decoders and encoders, graphic processors, and/or so forth that enable the portable recording device 118 to execute applications and provide telecommunication and data communication functions.

The one or more processors 206 and the memory 208 of the portable recording device 118 may implement a recording module 212, an activation module 214, a metadata module 216, the file transfer client application 134, a web server application 218, and the trusted environment 158. These modules may include routines, program instructions, objects, and/or data structures that perform particular tasks or implement particular abstract data types. The memory 208 may also provide a data store 220. In some embodiments, an operating system may also be implemented via the one or more processors 206 and the memory 208 to perform various functions, as well as provide an execution environment that supports the executions of applications and modules.

The recording module 212 may record the media files 128 via a camera and/or a microphone. The media files 128 may be in the form of video recordings, audio recordings, and/or multimedia recordings. Accordingly, the recording module 212 may include codecs, signal filters, coding functions, and/or error correction functions that enable the recording module 212 to convert generate digital files from camera and microphone signal inputs. In various embodiments, the recording module 212 may store the data assets in the data store 220. The recording module 212 may send its function status, such as recording started, recording stopped, recording paused, record error, etc., as metadata to the mobile dock 106 and/or the NOC 108 via the file transfer client application 134. Each function status may include relevant coded information. For example, the recording started status may contain coded information indicating whether the recording function is activated via a manual input at the recording device, a manual input from the mobile dock 106, an activation signal from the mobile dock 106, or an activation signal from the NOC 108. In another example, a record error status may include coded information that signifies conditions such as hardware failure, software error, lack of memory, low battery, and/or so forth.

The activation module 214 may activate the recording module 212 to capture and/or live stream data assets based on activation commands from the mobile dock 106 or the NOC 108. The activation module 214 may also receive manual inputs that start, stop, or pause the recording and/or live streaming of data assets via a user interface of the portable recording device 118. During live streaming, the recording module 212 may compress motion image data and/or audio data that are captured by the sensors 120 using a lossy or lossless compression (e.g., H.264, MPEG-4, etc.) for transmission to the mobile dock 106 via the file transfer client application 134. In turn, the file transfer server application 138 may relay the compressed live stream to the file management application 132 at the NOC 108.

The metadata module 216 may tag data assets that are recorded by the recording module 212 with metadata 130. In various embodiments, the metadata for a data asset may include associated case identification information, incident identification information, event identification information, a time and date stamp, a name of the associated law enforcement officer, a badge number of the associated law enforcement officer, a location at which at the data asset is captured, and/or so forth. In some instances, the metadata module 216 may tag a data asset with dispatch information when the capture of the data asset is triggered by the mobile dock 106 or the NOC 108. In some embodiments, the metadata module 216 may also receive additional input of descriptive data for the data assets that are inputted by a law enforcement officer. The descriptive data for a data asset may include an incident identifier, an event identifier, a case number, an involved party name, officer commentaries on the data asset, and/or so forth. Alternatively, the law enforcement officer may provide a code word, in which the code word is pre-assigned to represent an incident, an event, or a case.

In various embodiments, the law enforcement officer 104 may input descriptive data regarding the data assets via a user device 222. The user device 222 may be a smart phone, a feature phone, a tablet computer, or another mobile electronic device that is equipped with a display, a virtual or physical keyboard, as well as the ability to execute a web browser. In operation, the user device 222 may establish a high-energy communication connection 224 with the portable recording device 118. For example, in instances in which the high-energy transceiver 124 is a Wi-Fi transceiver, the law enforcement officer 104 may use a user interface of the portable recording device 118 to place the high-energy transceiver 124 into an access point mode. In this access point mode, the high-energy transceiver 124 is configured to provide communication access to the portable recording device 118 for a user device when the user device requests connection to the portable recording device 118 via an access point identifier and the correct encryption scheme type, and then provide the correct connection password. Once the high-energy communication connection is established, the user device 222 may send an access request to the portable recording device 118. In one implementation, the user device 222 may send the access request via a web browser 226 under the direction of the law enforcement officer 104. The access request may include a device identifier of the user device 222.

The device identifier of the user device 222 may be used by the file transfer client application 134 to determine ether the user device 222 is a trusted device. In various embodiments, the trusted environment 158 of the portable recording device 118 may contain a list 228 of device identifiers of trusted devices. The list 228 of trusted device identifiers may be pre-stored in the trusted environment 158 or periodically downloaded from the servers 112 of the NOC 108 as updates by the file transfer client application 134. For example, trusted devices are devices that are registered with the file management application 132 at the NOC 108. Accordingly, if the file transfer client application 134 determines that a device identifier indicates that a user device is a trusted device, the file transfer client application 134 may grant the user device 222 unrestricted access to the data files stored on the portable recording device 118. For example, the user device 222 may be used to read, write, delete, modify, upload, and download data files. Additionally, the user device may be used to install or remove applications from the portable recording device 118 via an operating system of the portable recording device 118.

However, if the file transfer client application 134 determined that a device identifier indicates that the user device is an untrusted device, the file transfer client application 134 may restrict the ability of the user device 222 to access the data files stored the portable recording device 118. In at least one implementation, the user device 222 may be limited to access data files via web pages that are provided by the web server application 218. In such an implementation, the web server application 218 may prompt the law enforcement officer to log on using an officer identifier and authentication credentials (e.g., password, biometric information, etc.). The web server application 218 may pass the officer identifier and the authentication credentials for verification by the file transfer client application 134 via a list of authorized authentication credentials stored in the trusted environment 158.

Once the law enforcement officer is authenticated, the web server application 218 may provide one or more web pages. For example, the web pages may provide interfaces for browsing the data files 126 that are stored on the portable recording device 118, interfaces for viewing the names of the data files, interfaces for adding or editing descriptive data (e.g., officer commentary) to data assets, interfaces for previewing data assets, interfaces for associating data assets with case identifiers, event identifiers, incident identifiers, and/or so forth, interfaces for reading or writing metadata to the data assets, or interfaces for downloading data files from or uploading data files (e.g., data assets, metadata, officer commentaries, etc.) to the NOC 108. However, access to one or more of these web page interfaces or functionalities on these web page interfaces may be restricted depending on the access privilege of the law enforcement officer. In some instances, the types of data files that are accessible to a particular law enforcement officer may be restricted based on an officer identifier of the law enforcement officer. In such instances, the file transfer client application 134 may use an access privilege table that dictates access specific privileges for specific officer identifiers. For example, the law enforcement officer may be restricted to performing actions on data files that are captured or created by the law enforcement officer. In another example, the law enforcement officer may be restricted to editing existing commentaries for data assets, but has no ability to create new commentaries for data assets.

In alternative embodiments, a user device may be equipped with a trusted device key that identifies the device as a trusted device. In such embodiments, a user device may send an access request to the portable recording device 118 that includes the trusted device key. Accordingly, the file transfer client application 134 may determine whether the user device 222 is a trusted device or an untrusted device based on whether a trusted device key is received from the user device 222. In further embodiments, the data that are exchanged between the portable recording device 118 and the user device 222 may be protected by a public-private asymmetric encryption key pair. In such embodiments, the file transfer client application 134 may provide a secure communication component of the web browser 226 with a public key, while retaining a private key of the public-private asymmetric encryption key pair. Thus, the user device 222 may send public key encrypted communication to the portable recording device 118 for decryption using the private key.

The data store 220 may include one or more databases, such as relational databases, object databases, object-relational databases, and/or key-value databases that store data. In at least some embodiments, the data store 220 may store the data files 126, in which the data files may include media files 128, the metadata 130, descriptive data for the data assets, the NFC unit identifier 148, and/or so forth. The data files 126 may be organized in the data store 220 according to their corresponding assigned identifiers, such as case identifiers, event identifiers, incident identifiers, and/or so forth. The trusted environment may store the public key of a public-private encryption key pair that are used for secure communication with the mobile dock 106, as well as the list of authorized dock identifiers 230 or the list of device authorization identifiers of mobile docks 232 that are authorized to communication with the mobile dock 106.

Example Computing Device Components

Figure 3:
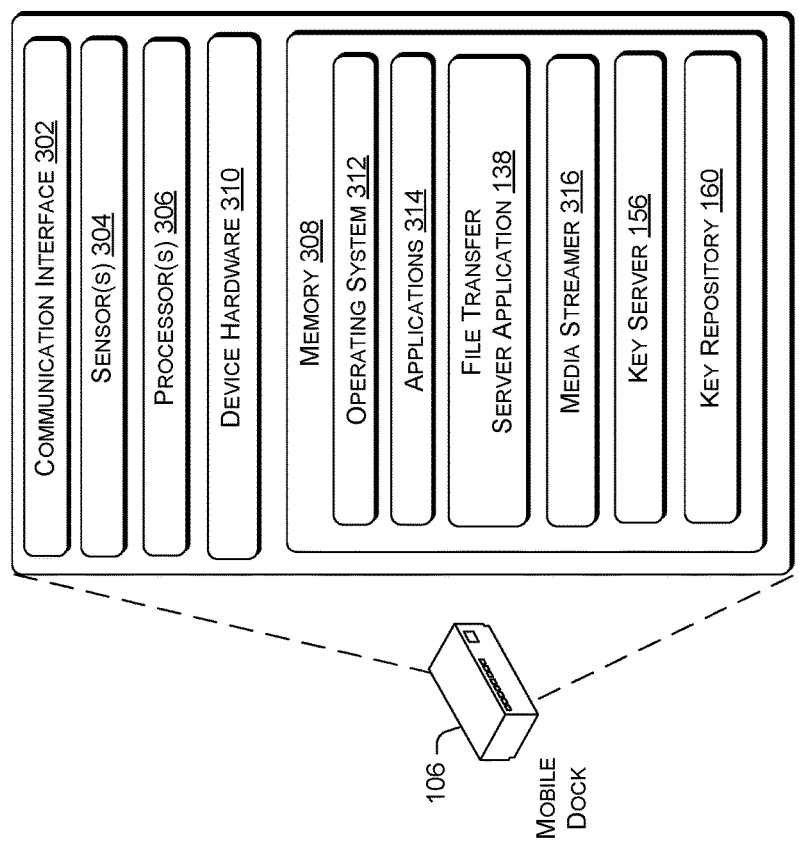
FIG. 3 is a block diagram showing various components of a computing device that receives data from a portable recording device via energy efficient communication.

FIG. 3 is a block diagram showing various components of a computing device that receives data from a portable recording device via energy efficient communication. The mobile dock 106 may be equipped with a communication interface 302, one or more sensors 304, one or more processors 306, and memory 308. The communication interface 302 may include wireless and/or wired communication components that enable the device to transmit or receive voice or data communication via the network connection 110, as well as other telecommunication and/or data communication networks. For example, the communication interface may include a cellular radio transceiver, a wired Ethernet transceiver, the low-energy transceiver 114, the high-energy transceiver 116, and/or so forth. The sensors 304 may include a compass, an accelerometer, and/or a global positioning system (GPS) sensor. The compass, the accelerometer, and the GPS sensor may detect orientation, movement, and geolocation of the mobile dock 106.

The memory 308 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism.

The device hardware 310 may include other hardware that is typically located on a computing device. For example, the device hardware 310 may include signal converters, antennas, modems, hardware decoders and encoders, graphic processors, a subscriber identity module (SIM) card slot, and/or the like that enable the mobile dock 106 to execute applications and provide telecommunication and data communication functions.

The one or more processors 306 and the memory 308 of the mobile dock 106 may implement an operating system 312 and applications 314. The operating system 312 may include components that enable the mobile dock 106 to receive and transmit data via various interfaces (e.g., user controls, communication interface 302, and/or memory input/output devices). The operating system 312 may also process data using the one or more processors 306 to generate outputs based on inputs that are received via hardware interfaces and software user interfaces. For example, the operating system 312 may provide an execution environment for executing the applications 314. The operating system 312 may include a presentation component that presents the output (e.g., display the data on an electronic display, store the data in memory, transmit the data to another electronic device, etc.).

The operating system 312 may include other components that perform various other functions generally associated with an operating system. For example, the operating system 312 may enable a user to interact with the applications 314 and other modules stored in the memory 308. The applications 314 may include utility and productivity applications. For example, the applications 314 may include telephony applications, wireless communication drivers and applications, electronic communication applications, and mobile data terminal applications to display dispatches and related information received from the NOC 108. The one or more processors 306 and the memory 308 of the mobile dock 106 may further implement the file transfer server application 138, a media streamer 316, the key server 156, and/or the key repository 160.

The media streamer 316 may provide the file management application 132 on the servers 112 of the NOC 108 with the ability to receive previews of the data assets. In turn, the file management application 132 may playback the previews of the data assets for viewing by a user at the NOC 108. In operation, the file transfer server application 138 may receive a preview request for a data asset that is stored on the portable recording device 118. The preview request may include a file identifier of the data asset. The file management application 132 may send the request to the mobile dock 106 via the network connection 110. In turn, the file transfer server application 138 may send a preview retrieval request for the data asset from the mobile dock 106 to the portable recording device 118.

The preview retrieval request may be sent via a high-energy communication connection (e.g., high-energy communication connection 152) that is established between the mobile dock 106 and the portable recording device 118. In response, the file transfer client application 134 may use a preview generation application to generate preview data for the data asset. For example, the preview data may be a motion JPEG image that previews the data asset for a predetermined amount of time. The file transfer server application 138 on the mobile dock 106 may receive the preview data for the data asset via the high-energy communication connection. In turn, the file transfer server application 138 may use the media streamer 316 to burst stream the preview data to the file management application 132 for presentation.

Example Processes

FIGS. 4-9 present illustrative processes 400-900 for performing energy efficient communication that facilitates data asset transfers. Each of the processes 400-900 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-900 are described with reference to the architecture 100 of FIG. 1.

Figure 4:
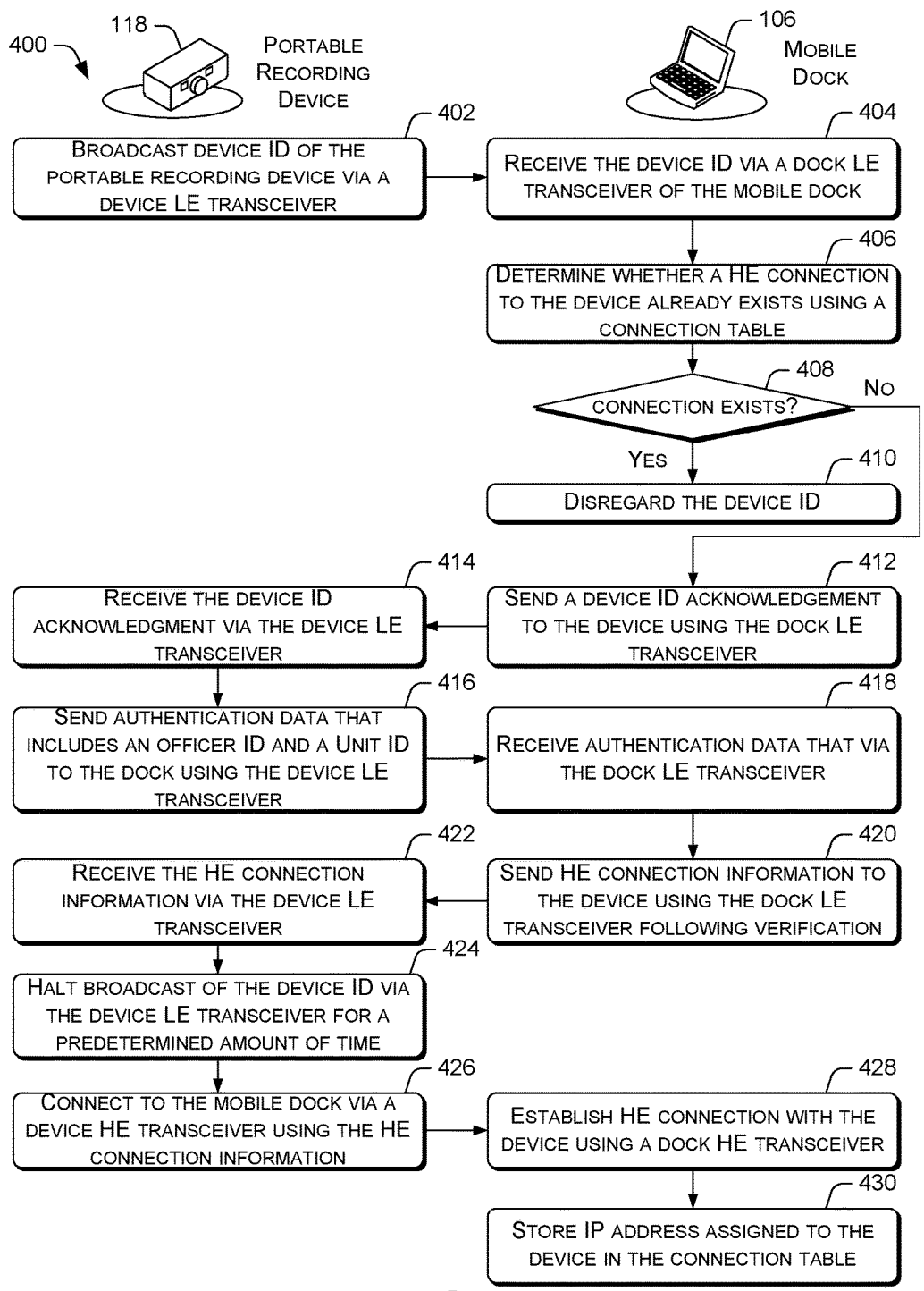
FIG. 4 is a flow diagram of an example process for using low-energy communication to trigger the establishment of a high-energy communication connection between a portable recording device and a computing device.

FIG. 4 is a flow diagram of an example process 400 for using low-energy communication to trigger the establishment of a high-energy communication connection between a portable recording device and a computing device. At block 402, the portable recording device 118 may broadcast the device identifier 136 of the portable recording device 118 via the low-energy transceiver 122. For example, the low-energy transceiver 122 may broadcast a device identifier 136 once every second. The device identifier 136 may be a device serial number, a device alphanumeric code, or another identifier that uniquely identifies the portable recording device 118. The portable recording device 118 may broadcast the device identifier 136 under the command of the file transfer client application 134. At block 404, the mobile dock 106 may receive the device identifier 136 via a low-energy transceiver 114 of the dock.

At block 406, the file transfer server application 138 on the mobile dock 106 may determine whether a high-energy connection to the portable recording device 118 already exists using a connection table that is stored in the memory 308 of the mobile dock 106. The connection table may be continuously updated by the file transfer server application 138 based on the high-energy communication connections that are formed and/or terminated between the mobile dock 106 and one or more portable recording devices. Accordingly, at decision block 408, the file transfer server application 138 may determine whether a high-energy communication connection with the portable recording device 118 exists. If the file transfer server application 138 determines that the high-energy communication connection already exists ("yes" at decision block 408), the process 400 may proceed to block 410. At block 410, the file transfer server application 138 may disregard the device identifier that is received from the portable recording device 118.

However, if the file transfer server application 138 determines that the high-energy communication connection does not already exist ("no" at decision block 408), the process 400 may proceed to block 412. At block 412, the file transfer server application 138 may send a device identifier acknowledgment to the portable recording device 118 using the low-energy transceiver 114. At block 414, the file transfer server application 138 may receive the device identifier acknowledgment via the low-energy transceiver 122. In some embodiments, the device identifier acknowledgement may include a dock identifier or a device authorization identifier of the mobile dock 106. Accordingly, the file transfer client application 134 may use such an identifier to verify that the mobile dock 106 is authorized to communicate with the portable recording device 118 before sending the authentication data 142.

At block 416, the file transfer client application 134 on the portable recording device 118 may send authentication data 142 that includes an officer identifier and a unit identifier to the mobile dock 106 using the low-energy transceiver 122. The officer identifier may identify an officer (e.g., law enforcement officer 104) that is using the portable recording device 118. The unit identifier may be a unique identifier of the portable recording device 118 that is assigned by a law enforcement agency, in which the unit identifier may differ from the device identifier.

At block 418, the file transfer server application 138 may receive the authentication data via the low-energy transceiver 114. Subsequently, the file transfer server application 138 may validate the authentication data using an assignment table. An assignment table is a structure in memory 208 and/or data store 220 of records and/or key-value pairs mapping a law enforcement officer, vehicle or entity to a portable recording device. The law enforcement officer may be identified by an officer identifier. Vehicles may have vehicle identifiers. Yet other entities may include a location identifier (such as in the case of portable recording device kept at static location in surveillance camera mode). Portable recording devices may be identified by a unit identifier for that portable recording device.

The assignment table may be provided to the mobile dock 106 and kept up-to-date by the file management application 132 of the NOC 108. The assignment table may show whether the officer identifier in fact matches and the unit identifier of the portable recording device that is checked out to a law enforcement officer. Accordingly, at block 420, assuming that the authentication data is verified, the file transfer server application 138 may send the high-energy connection information 150 to the portable recording device 118 using the low-energy transceiver 114.

At block 422, the portable recording device 118 may receive the high-energy connection information 150 via the low-energy transceiver 122. For example, in scenarios where the high-energy connection is a Wi-Fi connection, the information may include an access point identifier (e.g., SSID), the security encryption scheme type, and an access point password that controls connection access to the high-energy transceiver 116 of the mobile dock 106. At block 424, the file transfer client application 134 may halt the broadcast of the device identifier 136 for a predetermined amount of time.

At block 426, the file transfer client application 134 may command the high-energy transceiver 124 of the portable recording device 118 to connect to the mobile dock 106 based on the high-energy connection information 150. At block 428, the mobile dock 106 may establish the high-energy connection with the portable recording device 118 using the high-energy transceiver 116 of the mobile dock 106. In various embodiments, the connection may be established by a wireless connection application on the mobile dock 106. At block 430, the file transfer server application 138 may command the wireless connection application to store the internet protocol (IP) address assigned to the portable recording device 118 in the connection table.

Figure 5:
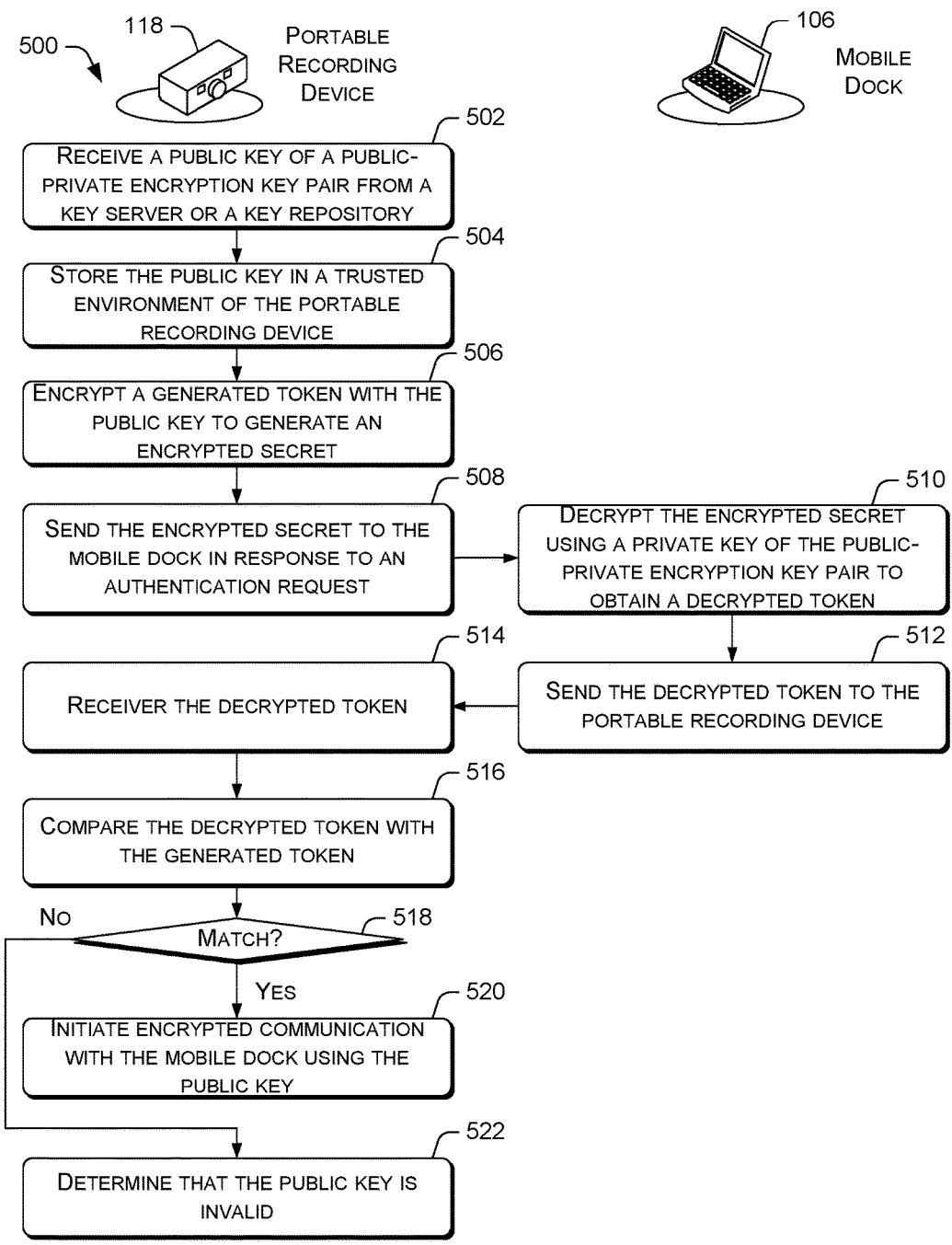
FIG. 5 is a flow diagram of an example process for using a public-private asymmetric encryption key pair to secure the establishment and use of a high-energy communication connection.

FIG. 5 is a flow diagram of an example process 500 for using a public-private asymmetric encryption key pair to secure the establishment and use of a high-energy communication connection. The process 500 may be performed prior to the block 416 of the process 400. At block 502, the file transfer client application 134 on the portable recording device 118 may receive a public key of a public-private encryption key pair from the key server 156 or the key repository 160. In various embodiments, the key server 156 may reside on the servers 112 of the NOC 108 or the mobile dock 106, while the key repository 160 may reside on the mobile dock 106.

At block 504, the file transfer client application 134 may store the public key in a trusted environment 158 of the portable recording device 118. The trusted environment 158 may be an isolated execution space that is provided by dedicated software and/or hardware of a device. At block 506, the file transfer client application 134 may encrypt a generated token with the public key to generate an encrypted secret. At block 508, the file transfer client application 134 may send the encrypted secret to the mobile dock 106 in response to an authentication request. In various embodiments, the file transfer server application 138 on the mobile dock 106 may send the authentication request in conjunction with a device identifier acknowledgment. In this way, any data that is transmitted from the file transfer client application 134 to the file transfer server application 138 may be protected via asymmetric encryption. The portable recording device 118 may send the encrypted secret to the mobile dock 106 via the low-energy communication connection 140.

At block 510, the mobile dock 106 may receive the encrypted secret via the low-energy communication connection. Subsequently, the file transfer server application 138 may decrypt the encrypted secret using a private key of the public-private encryption key pair to obtain a decrypted secret. In various embodiments, the mobile dock 106 may receive the private key from the key server 156, or the private key may have been pre-stored in the key repository 160 on the mobile dock 106.

At block 512, the file transfer server application 138 may command the mobile dock 106 to send the decrypted token to the portable recording device 118. In various embodiments, the mobile dock 106 may transmit the decrypted token using the low-energy communication connection 140. At block 514, portable recording device 118 may receive the decrypted token via the low-energy communication connection 140.

At block 516, the file transfer client application 134 may compare the decrypted token with the generated token. Thus, at decision block 518, if the file transfer client application 134 determines that the decrypted token matches the generated token, the process 500 may proceed to block 520. At block 520, the file transfer client application 134 may initiate encrypted communication with the file transfer server application 138 on the mobile dock 106 using the public key. For example, the file transfer client application 134 may send public key-encrypted authentication data 142 and/or public key-encrypted data files 126 to the mobile dock 106. However, if the file transfer client application 134 determines that the decrypted token does not match the generated token, the file transfer client application 134 may determine that the public key is invalid.

Figure 6:
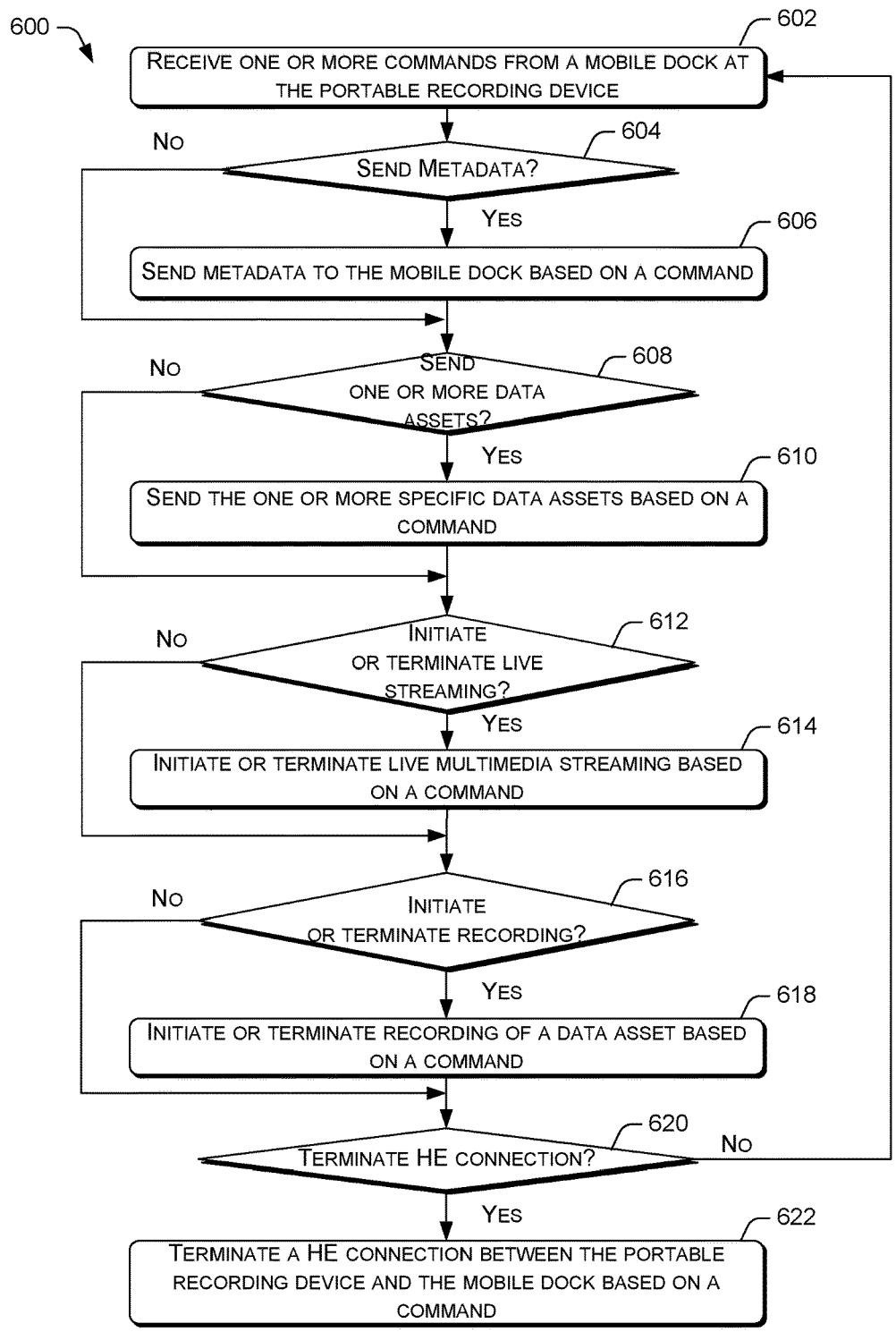
FIG. 6 is a flow diagram of an example process for use a high-energy communication connection to transfer data and revert to low-energy communication between the portable recording device and the computing device.

FIG. 6 is a flow diagram of an example process 600 for use a high-energy communication connection to transfer data and revert to low-energy communication between the portable recording device and the computing device. At block 602, the file transfer client application 134 of the portable recording device 118 may receive one or more commands. In various embodiments, the commands may be received via a high-energy communication connection between the portable recording device 118 and a dock, in which the dock may be the mobile dock 106 or the master dock 162. The commands may originate from the file management application 132 at the NOC 108 or the file transfer server application 138 on the mobile dock 106.

At decision block 604, the file transfer client application 134 may determine whether to send metadata to the dock based on a command. The metadata may include a GPS location and/or other geolocation coordinates of the portable recording device, the total number of data assets captured by the device, the number of data assets that are captured each sensor of the device, sensor and operational data regarding the device, and/or so forth. The metadata for a data asset may further include case identification information, incident identification information, event identification information, a time and date stamp, a name of the associated law enforcement officer, a badge number of the associated law enforcement officer, a location at which at the data asset is captured, a unit identifier of the portable recording device that captured the data asset, officer commentary on data assets, and/or so forth. Accordingly, if the file transfer client application 134 determines that the metadata data is to be sent ("yes" at decision block 604), the process 600 may proceed to block 606. At block 606, the file transfer client application 134 may send the metadata to the dock via the high-energy communication connection based on the command. However, if the file transfer client application 134 determines that no metadata data is to be sent ("no" at decision block 604), the process 600 may proceed to decision block 608.

At decision block 608, the file transfer client application 134 may determine whether to send one or more data assets to the dock based on a command. In various embodiments, the data assets may be in the form of video recordings, audio recordings, or multimedia recordings. Accordingly, if the file transfer client application 134 determines that the one or more data assets are to be sent ("yes" at decision block 608), the process 600 may proceed to block 610. At block 610, the file transfer client application 134 may send the one or more specific data assets to the dock via the high-energy communication connection based on the command. For example, the command may request data assets that have corresponding assigned identifiers, or data assets that lack corresponding assigned identifiers, in which a corresponding assigned identifier may be a case identifier, an incident identifier, or an event identifier. In another example, the command may request data assets whose metadata shows that they are associated with a specific unit identifier, officer identifier, and/or so forth. However, if the file transfer client application 134 determines that no data asset is to be sent ("no" at decision block 608), the process 600 may proceed to decision block 612.

At decision block 612, the file transfer client application 134 may determine whether to initiate or terminate live multimedia stream to the dock based on a command. The live multimedia stream may be carried to the dock via a high-energy communication connection. In turn, the dock may carry the live multimedia stream to the servers 112 via a cellular network connection. In various embodiments, the initiation or termination of the live multimedia streaming may be requested by the file management application 132 at the NOC 108. Accordingly, if the file transfer client application 134 determines that a live stream is to be initiated or terminated ("yes" at decision block 612), the process 600 may proceed to block 614. At block 614, the file transfer client application 134 may initiate or terminate the live multimedia streaming base on the command. However, if the file transfer client application 134 determines that no action with respect to the live multimedia streaming is to be taken ("no" at decision block 612), the process 600 may proceed to decision block 616.

At decision block 616, the file transfer client application 134 may determine whether to send initiate or terminate a recording of a data asset based on a command. In various embodiments, the initiation or termination of the data asset may be requested by the file management application 132 at the NOC 108. Accordingly, if the file transfer client application 134 determines that the recording of a data asset is to be initiated or terminated ("yes" at decision block 616), the process 600 may proceed to block 618. At block 618, the file transfer client application 134 may initiate or terminate the recording of the data asset. However, if the file transfer client application 134 determines that no action with respect to the recording of a data asset is to be taken ("no" at decision block 616), the process 600 may proceed to decision block 620.

At decision block 620, the file transfer client application 134 may determine whether to terminate the high-energy communication connection based on a command. In various embodiments, the termination of the high-energy communication connection may be requested by the file management application 132 at the NOC 108. Accordingly, if the file transfer client application 134 determines that the high-energy communication connection is to be terminated ("yes" at decision block 620), the process 600 may proceed to block 618. At block 618, the file transfer client application 134 may command the portable recording device 118 to terminate the high-energy communication connection. However, if the file transfer client application 134 determines that no action with respect to the high-energy communication connection is to be taken ("no" at decision block 620), the process 600 may loop back to block 602.

Figure 7:
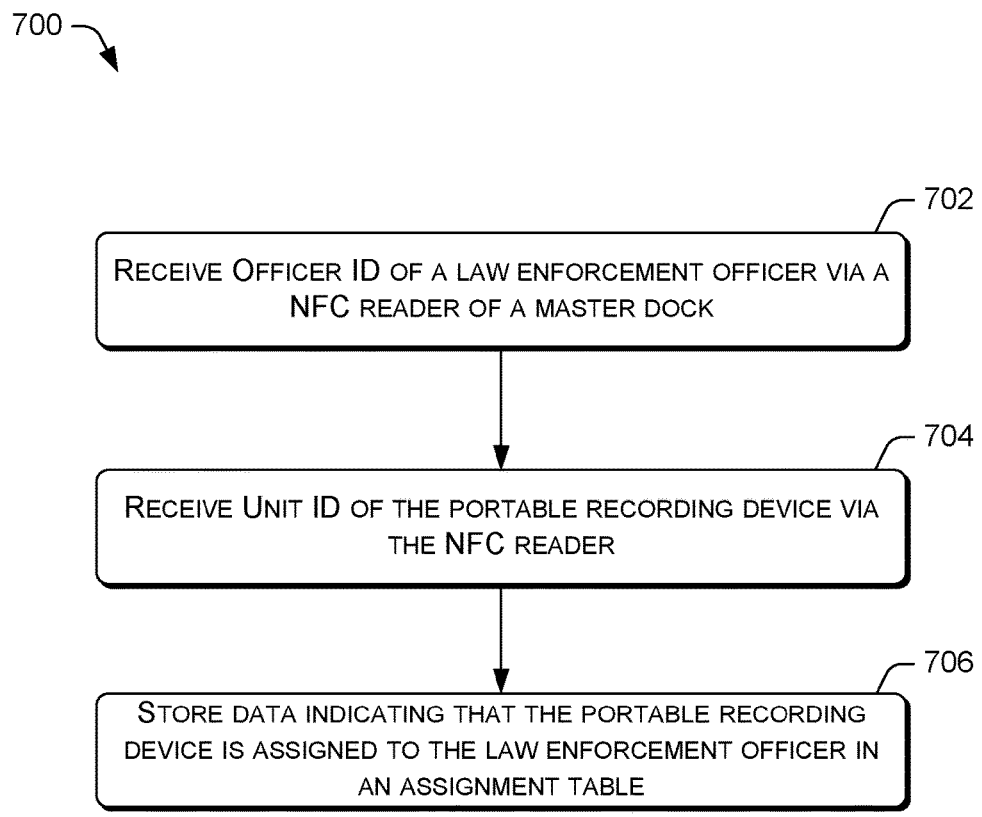
FIG. 7 is a flow diagram of an example process for identifying a portable recording device that is assigned to a law enforcement officer.

FIG. 7 is a flow diagram of an example process 700 for identifying a portable recording device that is assigned to a law enforcement officer. At block 702, the file management application 132 may receive an officer identifier of a law enforcement officer via a NFC reader that is attached to the servers 112 of the NOC 108. The officer identifier may be included in the NFC-tagged identification card 146 that is issued to the officer, in which the NFC-tagged identification card 146 is scanned by the NFC reader.

At block 704, the file management application 132 may receive a unit identifier of the portable recording device 118 via the NFC reader. The unit identifier may be in the form of a NFC identification tag (i.e., NFC unit identifier 148) that is affixed to the portable recording device 118. The NFC identification tag may be scanned via the NFC reader. In some embodiments, a user may use the NFC reader to scan the NFC identification tag following a prompt message that is presented to the user by the file management application 132. The prompt message may indicate that the user must scan the NFC identification tag within a predetermined amount of time following the scan of the NFC-tagged identification card 146 by the NFC reader to associate the portable recording device 118 with the law enforcement officer 104.

At block 706, the file management application 132 may store data indicating that the portable recording device 118 is assigned to the law enforcement officer 104 in an assignment table. In some embodiments, the portable recording device 118 may be associated with the law enforcement officer 104 when the NFC unit identifier 148 is scanned within a predetermined amount of time from the scan of the NFC-tagged identification card 146.

Figure 8:
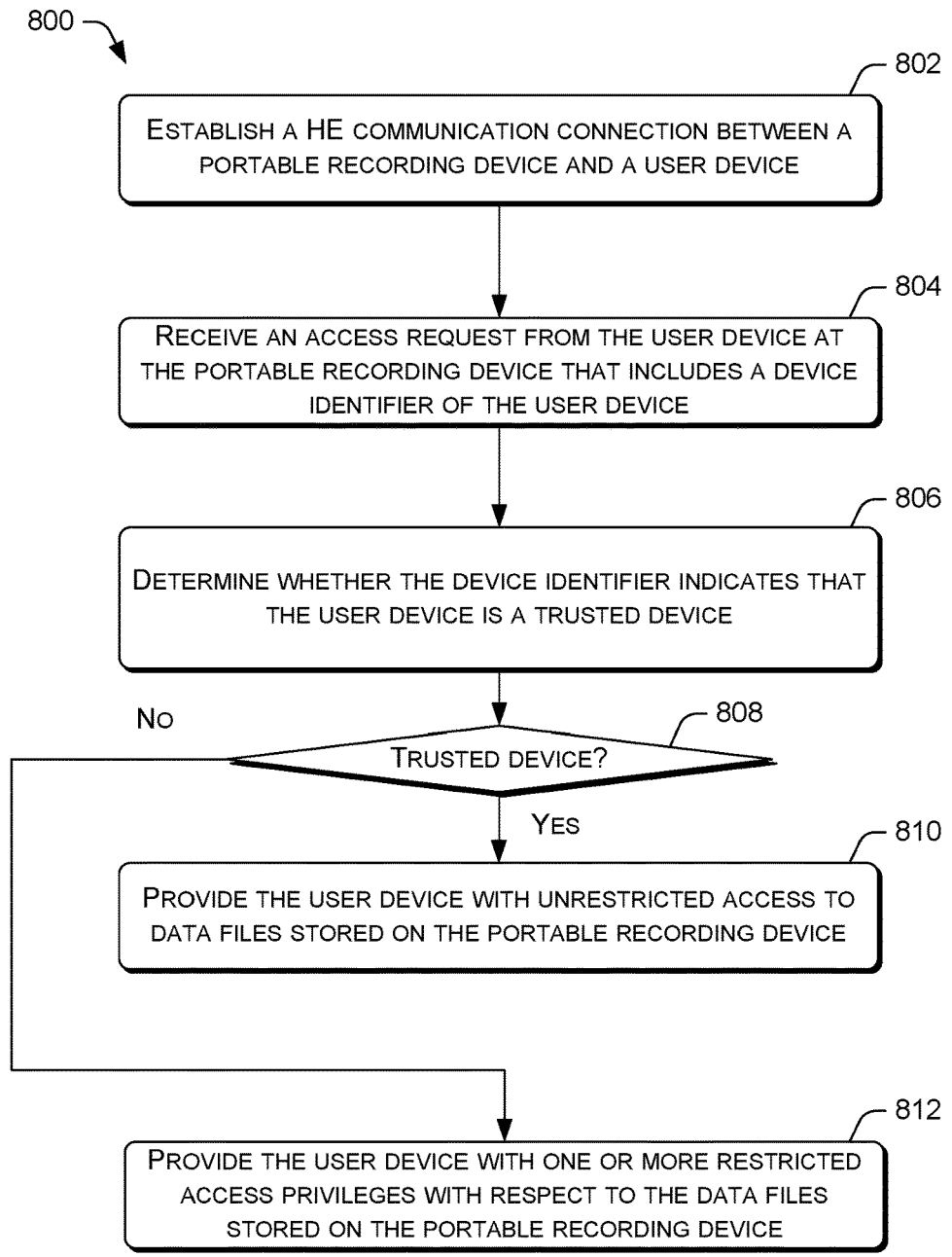
FIG. 8 is a flow diagram of an example process for providing a user device access to the portable recording device based on a trust state of the user device.

FIG. 8 is a flow diagram of an example process 800 for providing a user device access to the portable recording device based on a trust state of the user device. At block 802, the portable recording device 118 may establish a high-energy communication connection between the portable recording device 118 and a user device, such as the user device 222. For example, in instances in which the high-energy transceiver 124 of the portable recording device 118 is a Wi-Fi transceiver, the law enforcement officer 104 may use a user interface of the portable recording device 118 to place the high-energy transceiver 124 into an access point mode. The access point mode may enable the user device 222 to from the high-energy communication connection with the portable recording device 118.

At block 804, the file transfer client application 134 on the portable recording device 118 may receive an access request from the user device that includes a device identifier of the user device. At block 806, the file transfer client application 134 may determine whether the device identifier indicates that the user device trusted device. In some embodiments, the determination may be made by comparing the device identifier to a list of trusted device identifiers that are stored in a trusted environment 158 of the portable recording device 118. In other embodiments in which the device identifier is a trusted device key that identifies the device as a trusted device, the determination may be made based directly on whether the trusted device key is present in the access request.

Accordingly, at decision block 808, if the file transfer client application 134 determines that the user device is a trusted device, the process 800 may proceed to block 810. At block 810, the file transfer client application 134 may provide the user device with substantively unrestricted access to data files stored on the portable recording device 118. For example, the user device 222 may be used to read, write, delete, modify, upload, and download data files.

However, if the file transfer client application 134 determines that the user device is an untrusted device, the process 800 may proceed to block 812. At block 812, the file transfer client application 134 may provide the user device with one or more restricted access privileges with respect to the data files stored on the portable recording device. For example, the user device may be limited to one or more of browsing the data files that are stored on the portable recording device 118, viewing the names of the data files, adding or editing descriptive data (e.g., officer commentary) to data assets, previewing data assets, associating data assets with identifiers, reading or writing metadata to the data assets, or downloading data files from or uploading data files to the NOC 108. For example, the downloaded data files may include data files (e.g., data assets, metadata, officer commentaries, etc.) that have been edited or modified via applications on the servers 112 of the NOC 108.

Figure 9:
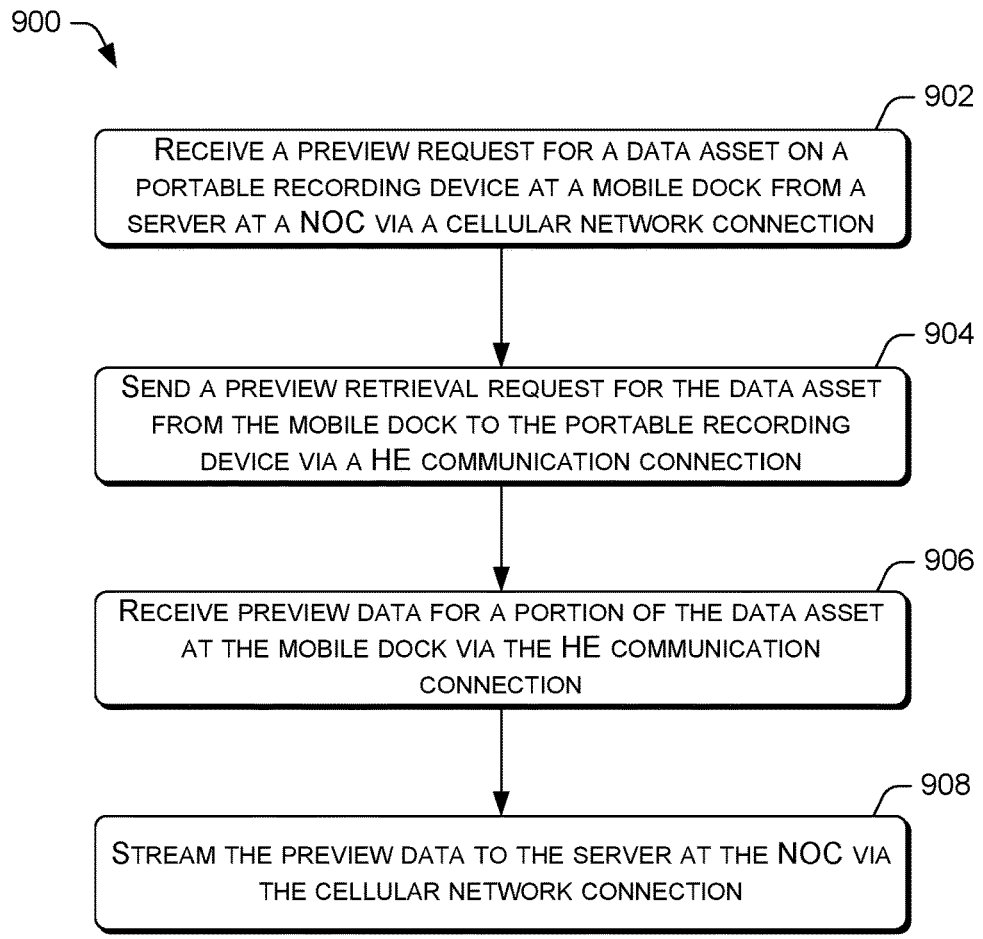
FIG. 9 is a flow diagram of an example process for providing a preview of a data asset that is on a portable recording device to a server at a network operations center for presentation to a user.

FIG. 9 is a flow diagram of an example process 900 for providing a preview of a data asset that is on a portable recording device to a server at a network operations center for presentation to a user. At block 902, the file transfer server application 138 on the mobile dock 106 may receive a preview request for a data asset that is stored on the portable recording device 118. The preview request may have originated from a file management application 132 that is on server 112 of the NOC 108. The server 112 may send the preview request to the mobile dock 106 via the network connection 110.

At block 904, the file transfer server application 138 on the mobile dock 106 may send a preview retrieval request for the data asset to the portable recording device 118 via a high-energy communication connection that is established between the mobile dock 106 and the portable recording device 118. At block 906, the file transfer server application 138 on the mobile dock 106 may receive preview data for a portion of the data asset via the high-energy communication connection. The preview data may be generated by the file transfer client application 134 in response to the preview retrieval request. For example, the preview data may be a motion JPEG image that previews the data asset for a predetermined amount of time.

At block 908, the file transfer server application 138 on the mobile dock 106 may stream the preview data to the servers 112 of the NOC 108 via the network connection 110. In various embodiment, the file transfer server application 138 may use the media streamer 316 on the mobile dock 106 to burst stream the preview data to the file management application 132 on the servers 112. In turn, the file management application 132 may present the preview data to a user via data display software and display devices.

The use of a low-energy transceiver of a portable recording device to trigger the operation of a high-energy transceiver that establishes an on-demand high-energy communication connection between the portable recording device and another computing device may lead to the conservation of energy. The conservation of energy may prolong the battery life and operational endurance of the portable recording device. Further, the portable recording device may use a high-energy communication to connect to a trusted computing device or an untrusted computing device, in which an amount of access to the data and functionalities of the portable recording device may be determined based on the trust status of the computing device.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. A portable recording device, comprising:
a low-energy transceiver;
a high-energy transceiver;
one or more processors; and
memory having instructions stored therein, the instructions, when executed by the one or more processors, cause the one or more processors to perform acts comprising:
broadcasting a device identifier of the portable recording device via the low-energy transceiver;
sending, via the low-energy transceiver, authentication data to a computing device that returned an acknowledgment of the device identifier, the authentication data including a unit identifier of the portable recording device and an officer identifier of a law enforcement officer that checked out the portable recording device for use;
receiving, via the low-energy transceiver, high-energy connection information that is sent by a computing device, the high-energy connection information being sent following a verification by the computing device of the unit identifier of the portable recording device and the office identifier of the law enforcement officer;
connecting, via the high-energy transceiver, to the computing device via a high-energy communication connection that is formed using the high-energy connection information; and
sending one or more data files to the computing device via the high-energy communication connection, the one or more data files including a data asset that is captured by the portable recording device or metadata for the data asset.

2. The portable recording device of claim 1, wherein the low-energy transceiver is a Bluetooth transceiver or a near field communication (NFC) transceiver, and wherein the high-energy transceiver is a Wi-Fi transceiver, and the high-energy communication connection is a Wi-Fi communication connection.

3. The portable recording device of claim 1, further comprising a trusted environment that stores an encryption key that is used to encrypt data that is sent from the portable recording device to the computing device.

4. The portable recording device of claim 1, wherein the data asset is a video recording, an audio recording, a multimedia recording, or a live stream that is captured by the portable recording device.

5. The portable recording device of claim 1, wherein the metadata provide a count of data assets that are captured by each sensor of the portable recording device.

6. The portable recording device of claim 1, wherein the memory includes a data store for storing a plurality data assets, and multiple data assets of plurality of data assets are organized in the data store according to corresponding identifiers, and wherein the sending includes sending one or more data assets having a particular identifier to the computing device, or sending at least one data asset that lacks a corresponding identifier to the computing device, the corresponding identifier being a case identifier, an incident identifier, or an event identifier.

7. A computing device, comprising:
a low-energy transceiver;
a high-energy transceiver;
one or more processors; and
memory having instructions stored therein, the instructions, when executed by the one or more processors, cause the one or more processors to perform acts comprising:
receiving, via the low-energy transceiver, authentication data that includes a unit identifier of a portable recording device and an officer identifier of a law enforcement officer that checked out the portable recording device for use;

sending high-energy connection information via the low-energy transceiver to the portable recording device following a verification of the unit identifier of the portable recording device and the office identifier of the law enforcement officer that checked out the portable recording device for use, the high-energy connection information initiating the portable recording device to form a high-energy communication connection with the computing device via the high-energy transceiver; and receiving one or more data files from the portable recording device via the high-energy communication connection, the one or more data files including a data asset that is captured by the portable recording device or metadata for the data asset.

8. The computing device of claim 7, wherein the acts further comprise sending one or more commands to the portable recording device via the high-energy communication connection.

9. The computing device of claim 8, wherein the one or more commands includes a command that causes the portable recording device to send one or more specific data assets to the computing device, or causes the portable recording device to send the metadata that includes a count of the data assets that are captured by the portable recording device, a time stamp of a data asset, an officer identifier associated with the data asset, or a unit identifier of the portable recording device that captured the data asset.

10. The computing device of claim 8, wherein the one or more commands includes a command that causes the portable recording device to send one or more specific data assets having a particular identifier to the computing device, send at least one data asset that lacks a corresponding identifier, or send a data asset that is associated with a particular portable recording device or a particular officer identifier.

11. The computing device of claim 7, further comprising a cellular radio transceiver that provides a cellular network connection to a network operations center, wherein the acts further comprise sending the data files to the network operations center via the cellular network connection.

12. The computing device of claim 7, wherein the low-energy transceiver is a Bluetooth transceiver or a near field communication (NFC) transceiver, and wherein the high-energy transceiver is a Wi-Fi transceiver.

13. The computing device of claim 7, wherein the receiving includes receiving a data file that is encrypted via a public key of a public-private asymmetric encryption key pair, further comprising decrypting the data file using a private key of the public-private asymmetric encryption key pair that is stored on the computing device.

14. The computing device of claim 7, wherein the sending of the high-energy connection information causes the portable recording device to temporarily halt broadcasting of a device identifier of the portable recording device for a predetermined amount of time, the high-energy connection information including an access point identifier, a type of a security encryption scheme, and an access point password that controls connection access to the high-energy transceiver of the computing device.

15. A computer-implemented method, comprising:

broadcasting a device identifier of a portable recording device via a low-energy transceiver of the portable recording device;

receiving a device identifier acknowledgment from a computing device via the low-energy transceiver following the computing device determining that no high-energy communication connection exists between the computing device and the portable recording device;

sending authentication data that includes an officer identifier of a law enforcement officer using the portable recording device and a unit identifier of the portable recording device via the low-energy transceiver to the computing device in response to receipt of the device identifier acknowledgment;

receiving high-energy connection information from the computing device following the computing device determining that the officer identifier is associated with the unit identifier in an assignment table, the high-energy connection information including an access point identifier, a type of a security encryption scheme, and an access point password that controls connection access to a high-energy transceiver of the computing device;

forming a high-energy communication connection with the high-energy transceiver of the computing device via a high-energy transceiver of the portable recording device based on the high-energy connection information; and sending one or more data files to the computing device via the high-energy communication connection, the one or more data files including a data asset that is captured by the portable recording device or metadata for the data asset.

16. The computer-implemented method of claim 15, wherein the sending includes sending the authentication data that is encrypted via a public key of a public-private asymmetric encryption key pair for decryption on the computing device by a private key of a public-private asymmetric encryption key pair that is stored on the computing device, and wherein public key is requested from a key server of a network operation center by the portable recording device or pre-stored in the portable recording device based on an association of the portable recording device to the computing device.

17. The computer-implemented method of claim 15, wherein the low-energy transceiver is a Bluetooth transceiver or a near field communication (NFC) transceiver, and wherein the high-energy transceiver is a Wi-Fi transceiver.

18. The computer-implemented method of claim 15, wherein the portable recording device is associated with a law enforcement officer based on a scan of an NFC-tagged identification card of the law enforcement officer and a NFC unit identifier of the portable recording device via a NFC reader at a network operations center.

19. A portable recording device, comprising:

a low-energy transceiver;
a high-energy transceiver;
one or more processors; and
memory having instructions stored therein, the instructions, when executed by the one or more processors, cause the one or more processors to perform acts comprising:

broadcasting a device identifier of the portable recording device via a low-energy transceiver of the portable recording device;

receiving a device identifier acknowledgment from a mobile dock via the low-energy transceiver following the mobile dock determining that no high-energy communication connection exists between the mobile dock and the portable recording device, the device identifier acknowledgment including a dock identifier of the mobile dock;

determining that the mobile dock is authorized to communicate with the portable recording device based on the dock identifier of the mobile dock;

sending authentication data via the low-energy transceiver to the mobile dock in response to determining that the mobile dock is authorized to communicate with the portable recording device;

forming a high-energy communication connection with a high-energy transceiver of the mobile dock via the high-energy transceiver of the portable recording device following a verification of the authentication data by the mobile dock; and receiving one or more commands via the high-energy communication connection, the one or more commands for performing at least one action with respect to at least one data file stored on the portable recording device, the at least one data file including one or more data assets comprising a video recording, an audio recording, or a multimedia recording.

20. The portable recording device of claim 19, wherein the determining includes determining that the mobile dock is authorized to communicate with the portable recording device in response to the dock identifier being listed in a list of authorized dock identifiers that is stored on the portable recording device, or in response to the dock identifier being a device authorization identifier that identifies the mobile dock as a type of device that is authorized to communicate with the portable recording device.

21. The portable recording device of claim 19, wherein the one or more commands includes a command that causes the portable recording device to send a data asset or associated metadata for the data asset to a server at a network operations center, download the data asset or the associated metadata from the network operations center, send a preview of the data asset to the server at the network operations center, send commentary data for the data asset to the server at the network operations center, receive the commentary data for the data asset to the server at the network operations center, and wherein the mobile dock is connected to the network operations center via a cellular network connection.

22. The portable recording device of claim 19, wherein the one or more commands includes a preview retrieval request that causes the portable recording device to provide preview data for a data asset to a server at a network operations center, and wherein providing the preview data includes:

receiving the preview retrieval request for the data asset from the mobile dock via the high-energy communication connection, the preview retrieval request being generated by the mobile dock based on a preview request from a server at the network operations center;

generating preview data for a portion of the data asset via a preview generation application; and sending the preview data for the portion of the data asset to the mobile dock using the high-energy communication connection for streaming by the mobile dock to the server of the network operations center via a cellular network connection.

23. The portable recording device of claim 19, wherein the acts comprise receiving an edited data files at the portable recording device via the high-energy communication connection, the edited data file being generated at a server of a network operations center.

\* \* \* \* \*